United States Patent [19]

Nitta et al.

[11] Patent Number: 5,735,370
[45] Date of Patent: Apr. 7, 1998

[54] MOUNTING ARRANGEMENT OF A RUST PREVENTIVE COVER TO COVER A DISK ROTOR OF A DISK BRAKE

[75] Inventors: Makoto Nitta; Takahiro Itoh, both of Toyota, Japan

[73] Assignee: Toyota Jidosha Kabushiki Kaisha, Aichi-Ken, Japan

[21] Appl. No.: 789,472

[22] Filed: Jan. 27, 1997

[30] Foreign Application Priority Data

Jan. 29, 1996 [JP] Japan .................. 8-013347

[51] Int. Cl.$^6$ .................................................. F16D 65/00
[52] U.S. Cl. .................. 188/218 A; 277/237 A; 277/DIG. 4
[58] Field of Search .................. 188/218 A, 264 W; 192/112; 277/237 A, DIG. 4; 301/6.1, 6.8

[56] References Cited

U.S. PATENT DOCUMENTS 4,817,765  4/1989  Turak .................. 188/218 A
5,259,486  11/1993  Deane .................. 188/218 A

FOREIGN PATENT DOCUMENTS 2706377   9/1976  Germany .................. 188/218 A
59-47531  3/1984  Japan .................. 188/218 A
59-196735 12/1984  Japan .

Primary Examiner—Robert J. Oberleitner
Assistant Examiner—C. T. Bartz
Attorney, Agent, or Firm—Kenyon & Kenyon

[57] ABSTRACT

A mounting arrangement of a rust preventive cover which improves a mounting operation of the rust preventive cover by enabling a visual check of a condition of engagement between the rust preventive cover and a dust cover. The rust preventive cover covers a disk rotor provided in a disk brake for a vehicle. The rust preventive cover is mounted to a dust cover provided on an inner side of the disk rotor with respect to the vehicle. A plurality of protruding portions protrude inwardly from a wall of the rust preventive cover. An opening is formed in each of the protruding portions. An engaging portion is formed on an outer end of the dust cover so that the engaging portion engages with the opening.

8 Claims, 3 Drawing Sheets

MOUNTING ARRANGEMENT OF A RUST PREVENTIVE COVER TO COVER A DISK ROTOR OF A DISK BRAKE

BACKGROUND OF THE INVENTION

1. Field of the Invention

The present invention generally relates to a mounting arrangement of a rust preventive cover which covers a disk rotor of a disk brake provided in a vehicle and, more particularly, to a mounting arrangement of a rust preventive cover which provides an easy assembly operation.

2. Description of the Related Art

Generally, a disk brake for a vehicle comprises a disk rotor which is pressed by brake pads so as to generate a brake force. Since the disk rotor is normally made of a cast iron, the disk rotor tends to rust especially when a vehicle is stored outside for a long period of time or when the vehicle is subjected to a salty environment during marine transportation.

In order to prevent formation of rust on the disk rotor, the disk rotor is covered by a rust preventive cover which is mounted to a dust cover of the disk brake. The dust cover is located on an inner side of the disk rotor, and the rust preventive cover is mounted from outside of the vehicle body. That is, the disk rotor is accommodated in the space defined by the dust cover and the rust preventive cover. Thus, the disk rotor is prevented from being subjected to a rusty environment such as humid air or salty air. The rust preventive cover is provided for preventing rust during transportation or storage before the vehicle is delivered to a user. Thus, the rust preventive cover is attached to the vehicle immediately after the vehicle is assembled, and is removed immediately before the vehicle is delivered to a user. Accordingly, the attachment and removal of the rust preventive cover must be easy.

Conventionally, the rust preventive cover is mounted to the dust cover by using a connecting member. Specifically, the connecting member is attached to the rust preventive cover, and the connecting member is engaged with the dust cover to mount the rust preventive cover to the dust cover. Obviously, this mounting method of the rust preventive cover requires the connecting member and additional parts to fix the connecting member to the rust preventive cover. The additional parts may be staples in a case where the dust preventive cover is made of a hard and thick paper. Thus, there is a problem in that the number of parts included in the mounting arrangement of the dust preventive cover and a manufacturing cost thereof is increased.

In order to eliminate the above-mentioned problem, Japanese Laid-Open Utility Model Application No.59-196735 suggested a mounting arrangement of a rust preventive cover which does not require a connecting member. In this mounting arrangement, a fringe of the rust preventive cover is folded inwardly so as to form an overhang projecting inwardly. The rust preventive cover is mounted to the dust cover by engaging the overhang to an edge of the dust cover.

In the mounting arrangement disclosed in the above-mentioned Utility Model Application document, the engaging portion between the dust cover and the rust preventive cover is positioned inside the rust preventive cover. Thus, the condition of the engagement cannot be visually checked by observing the rust preventive cover from outside. Thus, there is a problem in that the mounting operation of the rust preventive cover is inconvenient, and the mounting arrangement is not reliable.

SUMMARY OF THE INVENTION

It is a general object of the present invention to provide an improved and useful mounting arrangement of a rust preventive cover in which the above-mentioned problems are eliminated.

A more specific object of the present invention is to provide a mounting arrangement of a rust preventive cover which improves a mounting operation of the rust preventive cover by enabling a visual check of a condition of engagement between the rust preventive cover and a dust cover.

Another object of the present invention is to provide a mounting arrangement of a rust preventive cover which enables an easy mounting operation of the rust preventive cover to a dust cover.

Another object of the present invention is to provide a mounting operation of a rust preventive cover which reduces manufacturing cost of the rust preventive cover.

In order to achieve the above-mentioned objects, there is provided according to the present invention a mounting arrangement of a rust preventive cover for a disk rotor provided in a disk brake for a vehicle, the rust preventive cover being mounted to a dust cover provided on an inner side of the disk rotor with respect to the vehicle, the mounting arrangement comprising:

a plurality of protruding portions protruding inwardly from a wall of the rust preventive cover;

an opening formed in each of the protruding portions; and an engaging portion formed on an outer end of the dust cover so that the engaging portion engages with the opening.

According to the above-mentioned invention, the mount of the rust preventive cover is achieved by forming the protruding portions on the wall of the rust preventive cover and forming the opening in each of the protruding portions. Since the rust preventive cover is mounted by the outer end of the dust cover engaging with the opening of the rust preventive cover, the outer end of the dust cover can be seen from outside in a state where the rust preventive cover is mounted to the dust cover. Thus, a condition of the engagement between the rust preventive cover and the dust cover can be easily checked by a visual inspection.

In one embodiment of the present invention, the protruding portions may be integrally formed by the wall of the rust preventive cover. Thus, no separate part is needed to achieve the mounting arrangement of the rust preventive cover.

Additionally, the rust preventive cover may be formed as a substantially cup-like shape and the dust cover may be formed as a substantially disk-like shape, the protruding portions of the rust preventive cover protruding in a radially inward direction, the engaging portion of the dust cover extending in a radially outward direction.

Further, a diameter defined by inner surfaces of the protruding portions may be smaller than a diameter of the engaging portion of the dust cover so that the engaging portion protrudes into the opening of each of the protruding portions when the rust preventive cover is mounted to the dust cover.

Additionally, a width of the opening of each of the protruding portions may be a predetermined distance greater than a thickness of the engaging portion of the dust cover protruding into the opening, the width and the thickness being measured in a direction perpendicular to a diametral direction of the rust preventive cover. This enables the rust preventive cover to move in a direction perpendicular to a diametral direction of the rust preventive cover. Thus, if an external force is exerted on the rust preventive cover in a direction perpendicular to the direction perpendicular to the diametral direction, the external force can be relaxed or absorbed by a movement of the engaging portion in the opening.

Additionally, the rust preventive cover may be in an elastically deformed state in a direction perpendicular to a diametral direction of the rust preventive cover when the engaging portion engages with the opening of each of the protruding portions of the rust preventive cover. This enables a positive engagement of the engaging portion of the dust cover with a surface of the opening of the rust preventive cover by an elastic force generated by the elastic deformation of the rust preventive cover.

Other objects, features and advantages of the present invention will become more apparent from the following detailed description when read in conjunction with the accompanying drawings.

DETAILED DESCRIPTION OF THE PREFERRED EMBODIMENT

Figure 1:
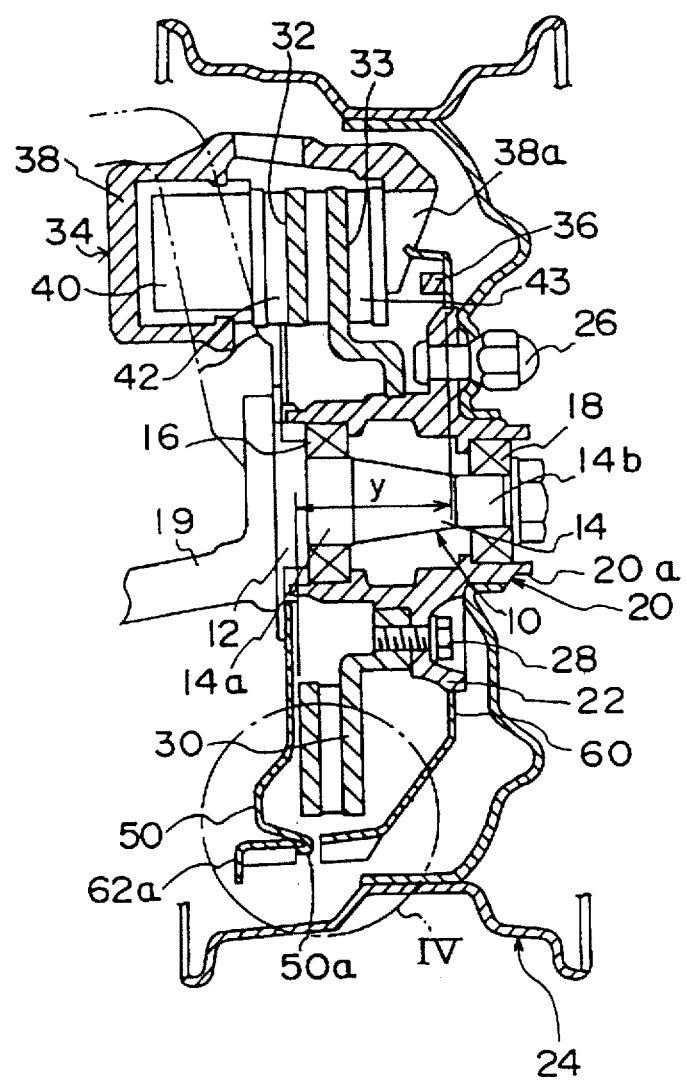
FIG. 1 is a cross-sectional view of a wheel and a disk rotor to which a rust preventive cover according to a first embodiment of the present invention is applied.

A description will now be given of a first embodiment of the present invention. FIG. 1 is a cross-sectional view of a wheel and a disk rotor provide on a vehicle to which a rust preventive cover according to the first embodiment of the present invention is applied.

In FIG. 1, a wheel 24 is supported by a wheel support shaft 10 which comprises a disk-like flange 12 and a generally cylindrical portion 14. The cylindrical portion 14 includes a large diameter portion 14a adjacent to the flange 12 and a small diameter portion 14b opposite to the large diameter portion 14a. A portion extending between the large diameter portion 14a and the small diameter portion 14b is tapered. An outer surface of the large diameter portion 14a is fit to an inner race of a bearing 16. An outer surface of the small diameter portion 14b is fit to an inner race of a bearing 18. A steering knuckle 19 is fixed on a surface of the flange 12 opposite to the wheel support shaft 10.

The wheel 24 is mounted to a wheel hub 20 which is rotatably supported by the wheel support shaft 10. The wheel hub 20 includes a generally cylindrical portion 20a. An outer race of the bearing 16 is fit to an inner surface of the cylindrical portion 20a on an inner side of the vehicle. An outer race of the bearing 18 is fit to an inner surface of the cylindrical portion 20a on an outer side of the vehicle. Additionally, an inner surface of the wheel 24 is fit on an outer surface of the cylindrical portion 20a on the outer side of the vehicle. A hub flange 22 is integrally formed with the wheel hub 20 on the outer surface of the wheel hub 20. The wheel 24 is fixed to the outer side of the hub flange 22 by hub nuts 26 (only one shown in the figure). A disk rotor 30 is fixed to the hub flange 22 on the inner side of the vehicle by mounting bolts 28 (only one shown in the figure).

The disk rotor 30 has a disk-like shape and is made of a steel. Brake surfaces 32 and 33 are formed on opposite surfaces of the disk rotor 30. A caliper 34 is provided on the peripheral portion of the disk rotor 30 so that the caliper 34 clamps the disk rotor 30.

The caliper 34 comprises a cylinder 38, an arm portion 38a, a piston 40 and a pair of pads 42 and 43. The arm portion 38a is integrally formed with the cylinder 38. The piston 40 is slidable within the cylinder 38 so that the piston 40 can move either leftwardly or rightwardly in the figure in response to a hydraulic pressure provided to the cylinder 38. The pad 42 is attached to an end of the piston 40. The pad 42 is positioned slightly away from the brake surface 32 of the disk rotor 30 when no hydraulic pressure is provided to the cylinder 38. The arm portion 38a extends from the side of the brake surface 32 to the side of the brake surface 33. The pad 43 is attached to an end surface of the arm portion 38a which faces the brake surface 33 of the disk rotor 30. The pad 43 is positioned slightly away from the brake surface 33 of the disk rotor 30 when no hydraulic pressure is provided to the cylinder 38.

The caliper 34 is movably supported by a torque plate mounted to the steering knuckle 19. That is, the caliper 34 is movable in either direction along the rotational axis of the wheel 24. When a hydraulic pressure is provided to the cylinder 38 of the caliper 34, the piston 40 is moved rightwardly in the figure, and the pad 42 contacts the brake surface 32 of the rotor 30. Since the caliper 34 is movable in the directions along the rotational axis of the wheel 24, the cylinder 38 and the arm portion 38a can move leftwardly in the figure. Thus, the rotor 30 is clamped by the pads 42 and 43 on the corresponding bearing surfaces 32 and 33. Friction forces are generated between the pad 42 and the brake surface 32 and between the pad 43 and the brake surface 33. The friction forces work as a brake force to the wheel 24. It should be noted that the caliper 34 is supported by a torque plate 36 in opposite directions with respect to the rotational direction of the disk rotor 30. Thus, the caliper 34 is prevented from being rotated together with the disk rotor 30.

A dust cover 50 is provided on the inner side of the disk rotor 30. The dust cover 50 is a disk-like rigid member which is mounted to the flange 12. The dust cover 50 has a cut-out portion in a position facing the caliper 34 so as to prevent interference between the dust cover 50 and the caliper 34. The remaining portion of the dust cover 50 covers the rotor 30. The dust cover 50 is bent to form an annular protrusion near the outer fringe thereof, the annular protrusion protruding toward the inside of the vehicle. A portion of the dust cover 50 between the annular protrusion and the outer fringe is U-shaped to form an engaging portion 50a.

A rust preventive cover 60 is mounted to the dust cover 50 from the outer side of the vehicle. The rust preventive cover 60 has a generally cup-like shape including a conical top portion with an opening in the center and a generally cylindrical bottom portion. The rust preventive cover 60 is made of a thin plate member such as a hard paper sheet. The center opening of the rust preventive cover 60 is fit to the outer periphery of the hub flange 22 so as to cover the surface of the rotor 30 facing toward the outside of the vehicle. The rust preventive cover 60 is attached during a period after the vehicle is assembled until the vehicle is delivered to a user. Thus, the rust preventive cover must be easily mounted and removed. Also, the rust preventive cover 60 should be light in weight and inexpensive. Considering such requirements, the rust preventive cover 60 is normally made of a thick paper material.

Figure 2:
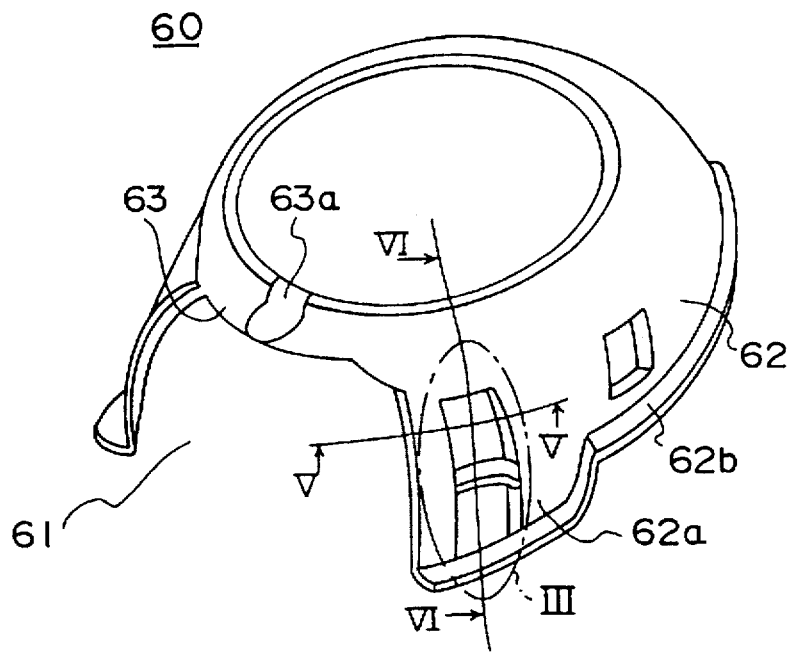
FIG. 2 is a perspective view of a dust protective cover shown in FIG. 1.
Figure 3:
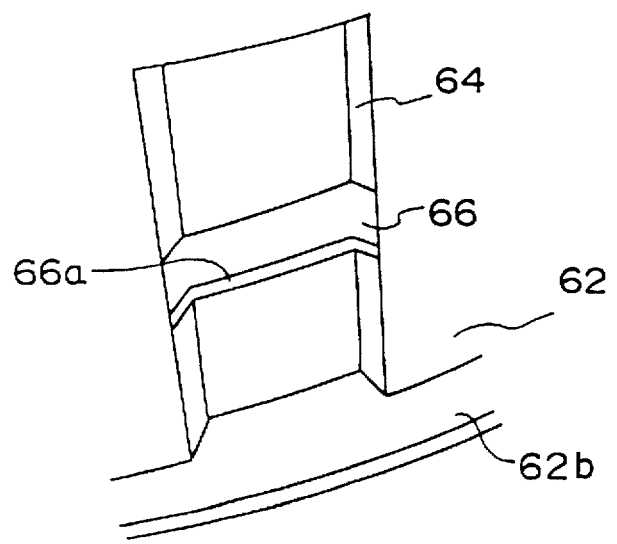
FIG. 3 is an enlarged view of a portion encircled by a chain line III in FIG. 2.

A description will now be give, with reference to FIGS. 2 and 3 in addition to FIG. 1, of a structure of the rust preventive cover 60. FIG. 2 is a perspective view of the rust preventive cover 60. FIG. 3 is an enlarged view of a portion encircled by a chain line III in FIG. 2.

As shown in FIG. 2, the rust preventive cover 60 has a cut-out portion 61 to prevent interference with the caliper 34. Thus, the rust preventive cover 60 includes a hat portion 62 and a bridge portion 63 extending above the cut-out portion 61. A height of portions 62a, which are located adjacent to the cut-out portion 61 and one opposite to the cut-out portion 61, is greater than the remaining portion of the hat portion 62. Each of the portions 62a has a predetermined length along a circumference of the hat portion 62. That is, three portions 62a having the height greater than the remaining portion are formed in the hat portion 62. A skirt 62b is formed on the fringe of the hat portion 62 so that the skirt 62b extends in a radially outward direction. The bridge portion 63 has an engaging portion 63a slightly protruding outwardly from a surface of the bridge portion 63 so that the engaging portion 63a engages with the torque plate 36.

The rust preventive cover 60 is provided with three protruding portions 64 which protrude from the respective portions 62a in a radially inward direction. The number of protruding portions 64 is not limited to three, and any number of protruding portions 64 may be provided. Each of the protruding portions 64 is formed by bending a wall of the rust preventive cover 60. A distance between the center axis of the wheel support shaft 10 and an inner surface of the protruding portion 64 is slightly (a few millimeters) smaller than a radius of the dust cover 50.

As shown in FIG. 3, a rectangular opening 66 is formed in each of the protruding portions 64 so that the rectangular opening 66 extends in a circumferential direction of the rust preventive cover 64 over the entire length of the protruding portion 64. The rectangular opening 66 is formed at a predetermined position so that a distance between the engaging portion 63a and a surface 66a of the rectangular opening 66, which distance is measured in a direction along the center axis of the wheel support shaft 10, is less than a distance y shown in FIG. 1. The distance y is a distance between a contacting surface of the torque plate 36 and the engaging portion 63a and an end of the engaging portion 50a measured in the direction along the center axis of the wheel support shaft 10.

Figure 4:
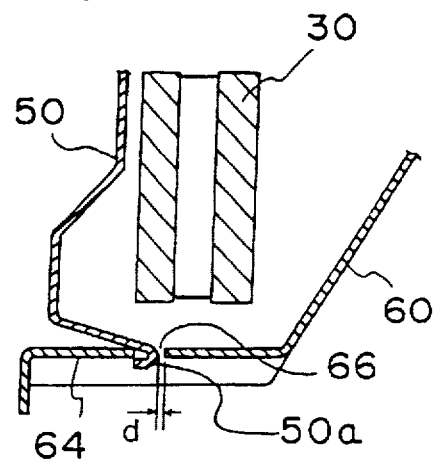
FIG. 4 is an enlarged cross-sectional view of an engaging portion of a dust cover and the rust preventive cover shown in FIG. 1.
Figure 5:
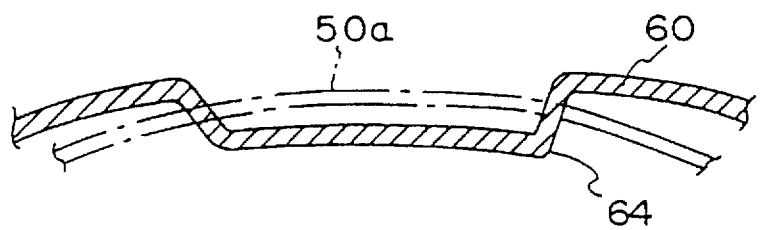
FIG. 5 is an enlarged cross-sectional view taken along a line V—V of FIG. 2.
Figure 6:
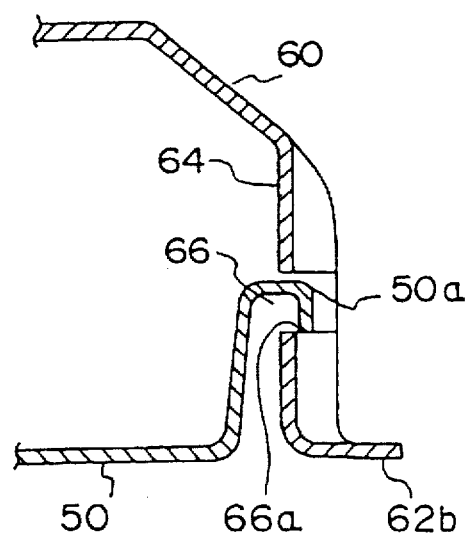
FIG. 6 is an enlarged cross-sectional view taken along a line VI—VI of FIG. 2.

A description will now be given, with reference to FIGS. 4 to 6 in addition to FIG. 1, of a mounting method of the rust preventive cover 60. FIG. 4 is an enlarged cross-sectional view of the engaging portion of the dust cover 50 and the rust preventive cover 60. FIG. 5 is an enlarged cross-sectional view taken along a line V—V of FIG. 2. FIG. 6 is an enlarged cross-sectional view taken along a line VI—VI of FIG. 2.

When the rust preventive cover 60 is mounted inside the wheel 24 as shown in FIG. 1, the rust preventive cover 60 is fit on the hub flange 22 before the wheel 24 is mounted to the hub flange 22. The engaging portion 63a of the bridge portion 63 is engaged with the torque plate 36. Then, the rust preventive cover 60 is pressed against the dust cover 50 so that the engaging portion 50a of the dust cover 50 enters into the rectangular opening 66 of each of the protruding portions 64 as shown in FIGS. 4 and 6. In this state, the end of the engaging portion 50a engages with the surface 66a of the rectangular opening 66. Since the diameter of the inner surface of the protruding portions 64 is slightly smaller than the outer diameter of the dust cover 50, the engaging portion 50a of the dust cover 50 is maintained in a state where the engaging portion 50a crosses the radial portions of the surface 66a of the rectangular opening 66 as shown in FIG. 5. Additionally, since the distance between the engaging portion 63a and a surface 66a of the rectangular opening 66, which distance is measured in the direction along the center axis of the wheel support shaft 10, is less than the distance y shown in FIG. 1, the rust preventive cover 60 is in an elastically deformed state when the engaging portion 50a of the dust cover 50 engages the surface 66a of the opening 66. Thus, the engaging portion 50a of the dust cover 50 is pressed against the surface 66a of the rectangular portion 66. This provides a positive engagement of the rust preventive cover 60 with the dust cover 50.

As mentioned above, the rust preventive cover 60 is removed immediately before the vehicle is delivered to a user. In this construction, the rust preventive cover 60 can be easily removed by strongly pulling a part of the skirt 62b inwardly so that the rust preventive cover 60 is torn by the pulling force. This operation can be done manually by a person. Thus, the removal of the rust preventive cover 60 is easy.

In the present embodiment, the engagement of the rust preventive cover 60 with the dust cover 50 is achieved by the rectangular opening 66 formed in the protruding portion 64. The protruding portion 64 can be easily formed on the wall of the rust preventive cover 60 without separate parts. Additionally, there is no need to prepare additional parts related to the mounting of the rust preventive cover 60 to the dust cover 50. Thus, the number of parts and assembling processes of the rust preventive cover 60 is not increased. Thus, a low manufacturing cost of the rust preventive 60 is achieved.

Additionally, in the mounting arrangement according to the present embodiment, the dust cover 50 engages with the rust preventive cover 60 within the rectangular openings 66 formed in each of the protruding portions 64 which protrude in a radially inward direction. Thus, the portions of the dust cover 50 engaging with the rust preventive cover 60 can be visually checked by observing the rectangular opening 66 from outside. Thus, in the mounting arrangement according to the present embodiment, the assembling operation of the rust preventive cover 60 is easy and reliable.

There is a possibility that water could intrude into a space defined by the rust preventive cover 60 and the dust cover 50. In such a case, if the water remains in the space between the rust preventive cover 60 and the dust cover 50, the space may be maintained in a humid condition for a long period of time. This promotes formation of rusts on the disk rotor 30. However, in the mounting arrangement according to the present embodiment, since the rust preventive cover 60 is provided with the rectangular opening 66, ventilation of an interior of the dust preventive cover 60 is improved. Thus, the humid air inside the dust preventive cover 60 is exhausted to the outside, resulting in prevention of rust which would otherwise form on the disk rotor 30.

Additionally, as shown in FIG. 4, a gap d is formed between the engaging portion 50a of the dust cover 50 and a surface of the rectangular opening 66 opposite to the surface 66a when the engaging portion 50a engages with the surface 66a. Accordingly, the rectangular opening 66 of the rust preventive cover 60 can be moved in a direction toward the inside of the vehicle along the center axis of the wheel support shaft 10. Thus, when an external force is exerted on the rust preventive cover 60 in the direction along the center axis of the wheel support shaft 10 due to a contact with, for example, the wheel 24, the external force can be relaxed or absorbed by a deformation of the rust preventive cover 60. The deformation of the rust preventive cover 60 is facilitated by the rectangular opening 66 being moved relative to the engaging portion 50a of the dust cover 50. Thus, the rust preventive cover 60 is prevented from damage due to an external force exerted thereon.

Further, in the mounting arrangement according to the present embodiment, the dust cover 50 engages with the rust preventive cover 60 within the rectangular openings 66 formed in each of the protruding portions 64 which protrude radially inwardly. According to this construction, since the protruding portions 64, which provide the engagement of the rust preventive cover 60 with the dust cover 50, protrude in a radially inward direction, the overall diameter of the rust preventive cover 60 can be reduced as compared to the conventional mounting arrangement in which connecting members protrude in a radially outward direction from the rust preventive cover. Thus, the size of the rust preventive cover 60 according to the mounting arrangement of the present embodiment is minimized.

The present invention is not limited to the specifically disclosed embodiments, and variations and modifications may be made without departing from the scope of the present invention.

What is claimed is:

1. A mounting arrangement for a rust preventive cover of a disk rotor provided in a disk brake for a vehicle, wherein the rust preventive cover is mounted to a dust cover provided on an inner side of the disk rotor with respect to the vehicle to separate an interior area within which the disk rotor is located from an exterior of the rust preventive cover, the mounting arrangement comprising:

a plurality of protruding portions protruding inwardly from a wall of the rust preventive cover;

an opening formed in each of the protruding portions wherein each opening extends through the rust preventive cover from the interior area to the exterior of the rust preventive cover; and an engaging portion formed on an outer end of the dust cover so that the engaging portion engages with the opening.

2. The mounting arrangement for a rust preventive cover as claimed in claim 1, wherein the protruding portions are integrally formed with the wall of the rust preventive cover.

3. The mounting arrangement for a rust preventive cover as claimed in claim 1, wherein the rust preventive cover is formed as a substantially cup-like shape and the dust cover is formed as a substantially disk-like shape, and wherein the protruding portions of the rust preventive cover protrude in a radially inward direction and the engaging portion of the dust cover extend in a radially outward direction.

4. The mounting arrangement for a rust preventive cover as claimed in claim 3, wherein a diameter defined by inner surfaces of each of the protruding portions is smaller than a diameter of the engaging portion of the dust cover so that the engaging portion protrudes into the opening of each of the protruding portions when the rust preventive cover is mounted to the dust cover.

5. A mounting arrangement for a rust preventive cover of a disk rotor provided in a disk brake for a vehicle, wherein the rust preventive cover is mounted to a dust cover provided on an inner side of the disk rotor with respect to the vehicle to separate an interior area within which the disk rotor is located from an exterior of the rust preventive cover, the mounting arrangement comprising:

a plurality of protruding portions protruding inwardly from a wall of the rust preventive cover;

an opening formed in each of the protruding portions, wherein each opening extends through the rust preventive cover from the interior area to the exterior of the rust preventive cover; and an engaging portion formed on an outer end of the dust cover so that the engaging portion engages with the opening, wherein a width of each opening is a predetermined amount greater than a thickness of the engaging portion protruding into the opening, and wherein the width and the thickness are measured in a direction perpendicular to a diameter of the rust preventive cover.

6. The mounting arrangement for a rust preventive cover as claimed in claim 3, wherein, when the engaging portion engages the openings, the rust preventive cover is in an elastically deformed state in a direction perpendicular to a diameter of the rust preventive cover.

7. The mounting arrangement for a rust preventive cover as claimed in claim 1, wherein the protruding portions extend in an axial direction of the disk rotor along the surface of the rust preventive cover from a first end to a second end thereof and wherein the openings are substantially centered between the first and second ends.

8. The mounting arrangement for a rust preventive cover as claimed in claim 1, wherein the engaging portion engages a portion of each of the openings.

* * * * *

UNITED STATES PATENT AND TRADEMARK OFFICE
CERTIFICATE OF CORRECTION

PATENT NO. : 5,735,370
DATED : April 7, 1998
INVENTOR(S) : Makoto NITTA, et al.

It is certified that error appears in the above-identified patent and that said Letters Patent is hereby corrected as shown below:

Column 5, line 5, change "give" to --given--.

Column 7, line 41, after "portions" insert a comma.

Column 8, line 7, change "extend" to --extends--.

Signed and Sealed this

Ninth Day of February, 1999

Attest:

*Attesting Officer*

*Acting Commissioner of Patents and Trademarks*